(12) United States Patent
Thomasset

(10) Patent No.: US 7,875,330 B2
(45) Date of Patent: Jan. 25, 2011

(54) MULTILAYER STRUCTURE

(75) Inventor: Jacques Thomasset, Vouvry (CH)

(73) Assignee: Aisapack Holding S.A, Vouvry (CH)

( * ) Notice: Subject to any disclaimer, the term of this patent is extended or adjusted under 35 U.S.C. 154(b) by 93 days.

(21) Appl. No.: 10/590,201

(22) PCT Filed: Feb. 26, 2005

(86) PCT No.: PCT/IB2005/050704

§ 371 (c)(1),
(2), (4) Date: Aug. 22, 2006

(87) PCT Pub. No.: WO2005/087601

PCT Pub. Date: Sep. 22, 2005

(65) Prior Publication Data

US 2007/0184223 A1     Aug. 9, 2007

(30) Foreign Application Priority Data

| Mar. 1, 2004 | (CH) | 0336/04 |
| Oct. 4, 2004 | (CH) | 1619/04 |
| Dec. 8, 2004 | (CH) | 2033/04 |
| Dec. 8, 2004 | (CH) | 2034/04 |

(51) Int. Cl.
*B32B 27/08* (2006.01)

(52) U.S. Cl. .......... 428/35.7; 428/34.1; 428/36.6; 428/36.7; 428/36.9; 428/36.91; 428/221

(58) Field of Classification Search .......... 428/34.1, 428/35.7, 35.8, 35.9, 36.1, 36.2, 36.5, 36.6, 428/36.7, 36.9, 36.91, 221
See application file for complete search history.

(56) References Cited

U.S. PATENT DOCUMENTS

| 3,901,638 A | | 8/1975 | Yoshikawa et al. |
| 3,969,563 A | * | 7/1976 | Hollis, Sr. ............. 428/175 |
| 4,390,487 A | | 6/1983 | O'Mara |
| 4,883,630 A | | 11/1989 | Langecker |
| 4,921,647 A | | 5/1990 | Stewart |
| 4,940,557 A | | 7/1990 | Kimura |
| 5,296,278 A | * | 3/1994 | Nishimura et al. ......... 428/36.1 |

(Continued)

FOREIGN PATENT DOCUMENTS

CH     408 766     2/1966

(Continued)

OTHER PUBLICATIONS

Written Opinion of the International Searching Authority.

(Continued)

*Primary Examiner*—Rena L Dye
*Assistant Examiner*—Walter B Aughenbaugh
(74) *Attorney, Agent, or Firm*—Nixon & Vanderhye P.C.

(57) ABSTRACT

A synthetic resin multilayer structure (1) delimited by a top face (2), borders (3, 5) and a bottom face (4) of surface area substantially identical to that of the top face (2), said structure (1) comprising:
  a first layer (6) defining said faces (2, 4) and said borders (3, 5),
  a second layer (7), disposed between said faces (2, 4) and said borders (3, 5), of surface area at least equal to that of said faces (2, 4),
characterized in that the second layer (7) forms at least one zigzag-shaped double fold (8, 9).

8 Claims, 16 Drawing Sheets

U.S. PATENT DOCUMENTS

| | | | |
|---|---|---|---|
| 5,403,529 | A | 4/1995 | Kawaguchi |
| 5,975,871 | A | 11/1999 | Kudert et al. |
| 6,332,767 | B1 | 12/2001 | Kudert et al. |
| 6,467,643 | B1 * | 10/2002 | Sadr .......................... 220/562 |
| 6,613,408 | B1 * | 9/2003 | Short ........................ 428/36.6 |
| 6,808,673 | B2 | 10/2004 | Van Schaftingen |
| 2002/0109267 | A1 | 8/2002 | Herbst |
| 2002/0182351 | A1 | 12/2002 | Akiyama et al. |

FOREIGN PATENT DOCUMENTS

| | | |
|---|---|---|
| EP | 0 668 216 | 8/1995 |
| EP | 0668216 | 11/1996 |
| FR | 2 659 267 | 9/1991 |
| JP | 02098415 | 4/1990 |
| JP | 2001-163321 | 6/2001 |
| WO | WO 98/56556 | 12/1998 |

OTHER PUBLICATIONS

Patent Abstracts of Japan, vol. 014, No. 305, Jun. 29, 1990 & JP 02 098415 A, Apr. 10, 1990.
International Search Report, Jul. 6, 2005.
International Search Report for PCT/IB2005/050704 (dated Jul. 6, 2005).
Written Opinion of International Searching Authority for PCT/IB2005/050704 (dated Jul. 6, 2005).
Office Action mailed Nov. 24, 2009 in U.S. Appl. No. 10/590,201.
Office Action mailed Feb. 5, 2010 in U.S. Appl. No. 10/591,117.
Office Action mailed Feb. 4, 2010 in U.S. Appl. No. 10/591,126.
Office Action mailed Dec. 3, 2009 in U.S. Appl. No. 10/591,127.
Office Action mailed Oct. 31, 2008 in U.S. Appl. No. 10/590,201.
Office Action mailed Jun. 8, 2009 in U.S. Appl. No. 10/590,201.
Advisory Action mailed Oct. 28, 2009 in U.S. Appl. No. 10/590,201.
Office Action mailed Jun. 11, 2008 in U.S. Appl. No. 10/591,117.
Office Action mailed Dec. 24, 2008 in U.S. Appl. No. 10/591,117.
Interview Summary mailed May 6, 2009 in U.S. Appl. No. 10/591,117.
Office Action mailed Aug. 18, 2009 in U.S. Appl. No. 10/591,117.
Interview Summary mailed Oct. 28, 2009 in U.S. Appl. No. 10/591,117.
Office Action mailed Jun. 12, 2008 in U.S. Appl. No. 10/591,116.
Notice of Allowance mailed Jan. 28, 2009 in U.S. Appl. No. 10/591,116.
Office Action mailed Jun. 12, 2008 in U.S. Appl. No. 10/591,126.
Office Action mailed Dec. 24, 2008 in U.S. Appl. No. 10/591,126.
Advisory Action mailed Apr. 6, 2009 in U.S. Appl. No. 10/591,126.
Office Action mailed Jul. 2, 2009 in U.S. Appl. No. 10/591,126.
Interview Summary mailed Oct. 28, 2009 in U.S. Appl. No. 10/591,126.
Office Action mailed Jun. 11, 2008 in U.S. Appl. No. 10/591,127.
Office Action mailed Dec. 17, 2008 in U.S. Appl. No. 10/591,127.
Advisory Action mailed Jul. 6, 2009 in U.S. Appl. No. 10/591,127.

\* cited by examiner

MULTILAYER STRUCTURE

This application is the US national phase of international application PCT/IB2005/050704 filed 26 Feb. 2005 which designated the U.S. and claims benefit of CH 00336/04; CH 01619/04; CH 02034/04 and CH 02033/04, dated 1 Mar. 2004; 4 Oct. 2004; 8 Dec. 2004 and 8 Dec. 2004, respectively, the entire content of which is hereby incorporated by reference.

FIELD OF THE INVENTION

The invention resides within the field of multilayer objects made of plastics material. It relates particularly, but not exclusively, to the field of packaging, especially flexible tube heads and plugs.

PRIOR ART

Patent U.S. Pat. No. 4,876,052 describes a multilayer object (FIG. 1) characterized in that a first synthetic resin 7 is fully imprisoned inside a second synthetic resin 6. This multilayer object is obtained by compression molding of a composite dose in which the first resin is totally imprisoned in the second resin. The multilayer structure described in patent U.S. Pat. No. 4,876,052 is particularly interesting for objects such as receptacles or lids. However, the method for obtaining these multilayer objects poses a number of difficulties. The production of the composite dose with a first resin totally imprisoned in the second resin calls for the intermittent extrusion of the first resin inside the second one. As described in patent U.S. Pat. No. 4,876,052, a coextrusion device having a shut-off valve mechanism for the first synthetic resin controls the intermittent flow of said first resin. However, these shut-off valve mechanisms are complicated and onerous, and they do not allow a sufficiently precise, repetitive and comfortable control of the intermittent flow. Also, the realization of multilayer objects according to patent U.S. Pat. No. 4,876,052 produces comparatively high prices owing to the cost of the production equipment.

In order to eliminate the drawbacks of patent U.S. Pat. No. 4,876,052, Japanese patent JP 2098415 proposes the realization of a multilayer object by compression molding starting from a composite dose characterized in that the second synthetic resin covers only the side faces of the first synthetic resin. The compression molding of this dose along its axis of symmetry produces an object having a multilayer structure (FIG. 2) characterized in that a first resin 6 partially imprisons a second resin 7. However, the multilayer objects realized from two resins according to patent JP 2098415 have two major drawbacks: the first being that of having the barrier resin 7 exposed on a central surface area of the object over about 5% of the total surface area of the object, and the second being that of requiring a quantity of barrier resin 7 in the object amounting to at least 30% of the total quantity of resin. This produces, on the one hand, objects having a prohibitive cost and, on the other hand, objects having heavily modified mechanical properties, mainly in the center of the object. Another drawback of patent JP 2098415 lies in the fact that the respective quantity of the resins 6 and 7 is only poorly adjustable, these quantities being fixed by the geometry of the object and by the flows during the compression of the dose.

In patent JP 2098415, it is proposed to use a triple-layer dose in order partially to eliminate the aforesaid drawbacks. This dose is constituted by a first resin 11 forming the central part of the dose, by a second resin 7 covering only the side faces of the first resin, and by a third resin 6 covering only the side faces of the second resin. The crushing of this composite dose along its axis of symmetry produces a multilayer object (FIG. 3). The use of a triple-layer dose has the advantage of reducing the quantity of barrier resin 7 used and produces objects having slightly modified mechanical properties in relation to the same object containing a single resin 6. However, the second resin 7 does not cover the central part of the multilayer object, which produces multilayer objects without barrier property close to the axis of symmetry. This central region of the object not covered by the barrier resin layer 7 weakens the barrier performance of the object and renders this solution less effective.

SUBJECT OF THE INVENTION

In order to eliminate the drawbacks of patents U.S. Pat. No. 4,876,052 and JP 2098415, a multilayer object and its method of realization by compression molding are proposed. This object is characterized by a unique multilayer structure, different from the prior art, which lends said object particularly advantageous barrier properties.

DETAILED DESCRIPTION OF THE INVENTION

A better understanding of the invention will be gained below from a detailed description of the examples illustrated by the following figures.

FIG. 1 shows a multilayer object of the prior art realized according to patent U.S. Pat. No. 4,876,052. This multilayer object contains a barrier resin layer 7 fully encapsulated in the resin 6 forming the object.

FIG. 2 illustrates a multilayer object of the prior art realized according to patent JP 2098415. This multilayer object comprises a barrier resin 7 partially encapsulated in the resin 6 forming the object. The resin 7 is visible on the surface of the central part of the object.

FIG. 3 illustrates a multilayer object of the prior art realized according to patent JP 2098415. This multilayer object comprises a barrier resin layer 7 encapsulated between the resins 6 and 11 forming the object. The barrier resin layer 7 does not extend into the central part of the object.

FIG. 4 shows a multilayer object belonging to the invention. This object contains a barrier resin layer 7 which forms a zigzag and extends throughout the object. The barrier resin layer 7 is imprisoned or partially imprisoned in a resin layer 6.

FIG. 5 shows a multilayer object according to the invention containing an orifice 10. This object is characterized by a barrier resin layer 7 which forms a zigzag and extends throughout the object, from the wall 3 forming the periphery of the object to the wall 5 forming the orifice.

FIG. 6 illustrates the fact that the central layer forming the zigzag can be constituted by a plurality of layers 12, 7 and 12'. In general, the layers 12 and 12' are layers of adhesive resins which allow the resin 7 forming the barrier layer to be put together with the resin 6 forming the structure of the object.

FIGS. 7 and 8 show that the resin layer 7 contains at least one zigzag. FIG. 7 shows a geometry of the resin layer 7 which is obtainable on tube shoulders.

FIG. 9 illustrates a tube shoulder realized according to the invention and an example of the distribution of the barrier resin layer 7 in the object.

FIGS. 10 to 14 present multilayer doses used to realize multilayer objects by compression molding.

FIG. 10 shows a dose of the prior art used to realize multilayer objects according to patent U.S. Pat. No. 4,876,052. This dose is characterized in that the barrier resin 7 is totally imprisoned in the resin 6.

FIG. 11 shows a dose of the prior art, described in patent JP 2098415. This dose comprises a barrier resin 7 encapsulated laterally by a second resin 6.

FIG. 12 illustrates a multilayer dose described in patent JP 2098415. This dose comprises 3 layers, the barrier layer 7 being imprisoned laterally between the resin layers 6 and 11.

FIG. 13 shows a tubular multilayer dose used within the scope of the invention. This dose comprises a central orifice, an inner layer 6', an intermediate layer 7 and an outer layer 6. The ends 13 and 13' of the barrier resin layer 7 are not generally encapsulated in the resins 6 and 6'.

FIG. 14 presents a multilayer dose having an orifice. This dose comprises 5 layers, of which two layers of adhesive resin 12 and 12' creating a cohesion between the barrier resin layer 7 and the resin layers 6 and 6'.

FIGS. 15 to 17 show a first method for realizing multilayer objects according to the invention.

FIG. 15 shows the positioning of a dose containing 3 layers 6, 7 and 6' in a compression device comprising a top plate 14, a bottom plate 15 and a plunger 16.

Figure 18:
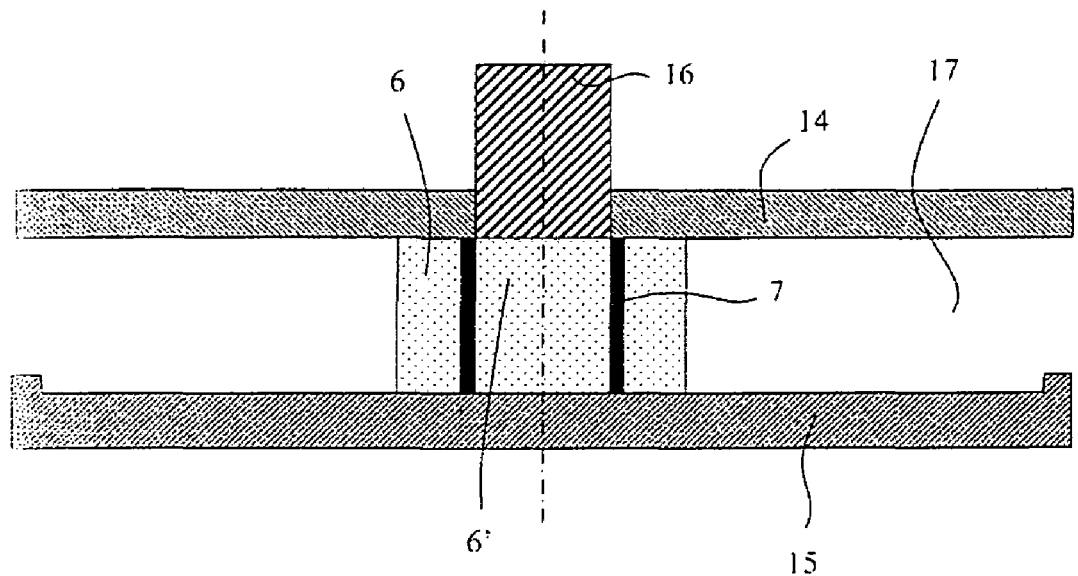
FIGS. 18 to 21 show a second method for realizing multilayer objects according to the invention, starting from a cylindrical multilayer dose.

FIG. 18 illustrates the positioning of the dose containing three layers 6, 7 and 6' in a compression device containing a top plate 14, a bottom plate 15 and a plunger 16.

Figure 19:
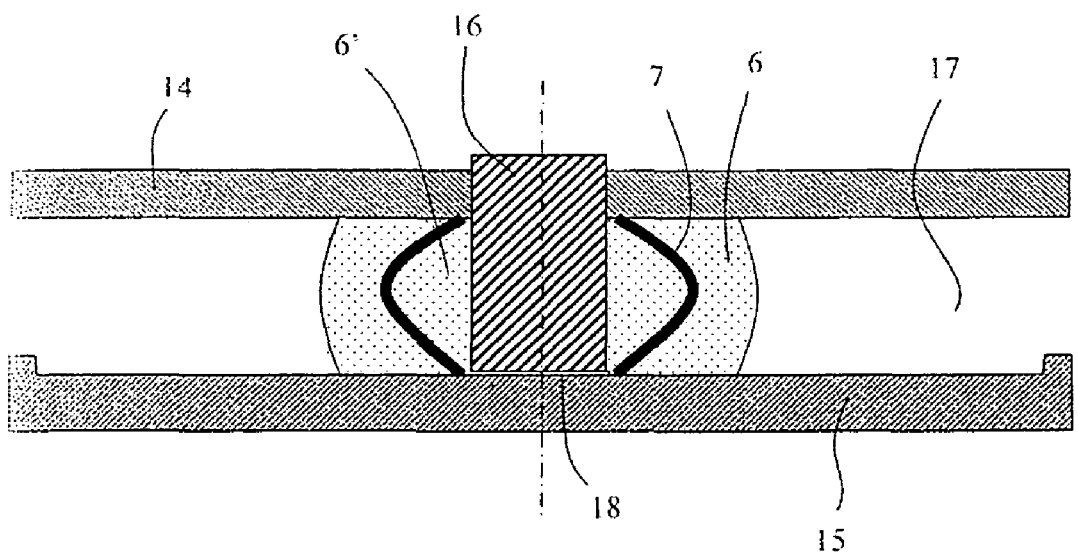

FIG. 19 illustrates the first phase of the process, which consists in compressing the central part of the dose between the plunger 16 and the bottom plate 15.

Figure 20:
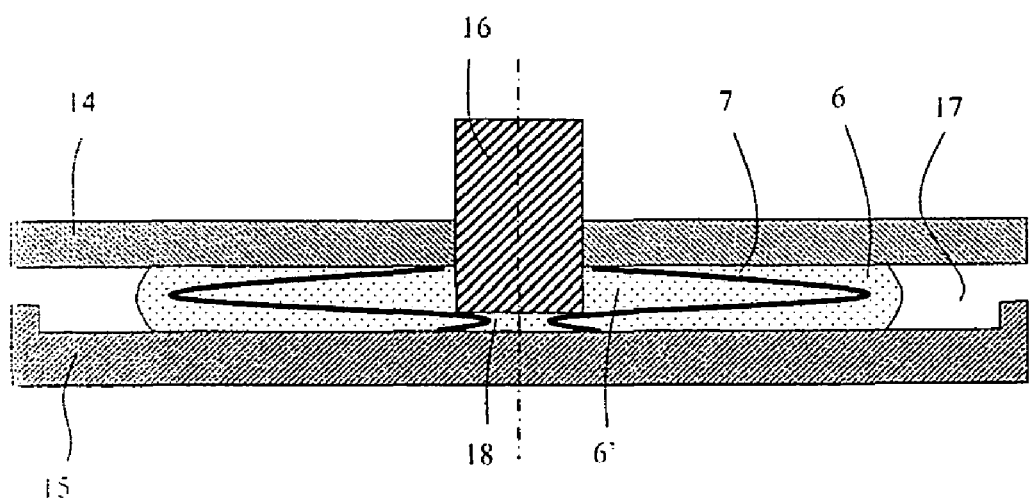

FIG. 20 shows a subsequent phase of the compression process. The dose is compressed between the plates 14 and 15, creating a flow of resin toward the periphery, whereas the upward motion of the plunger 16 creates an increased clearance and a flow of resin toward the center.

Figure 21:
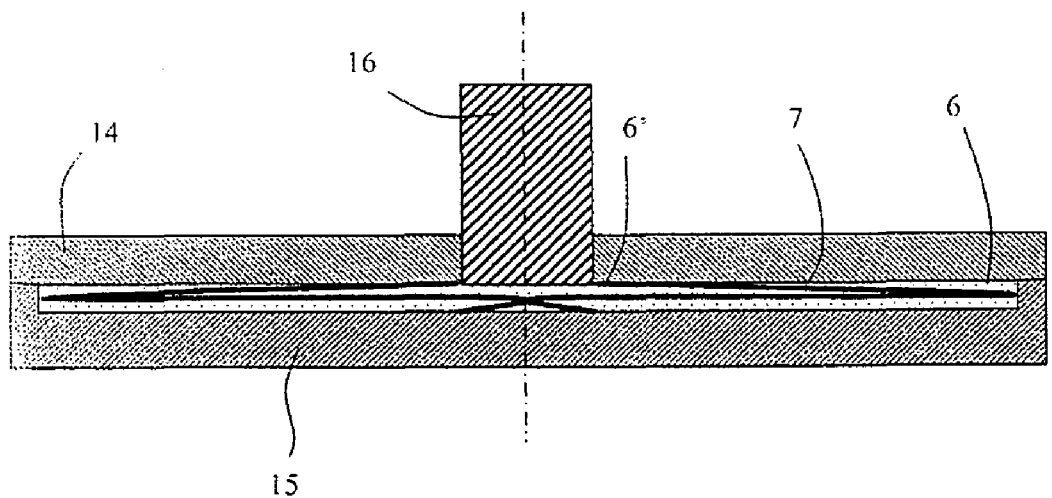

FIG. 21 shows the multilayer object obtained at the conclusion of the compression.

FIGS. 22 to 25 show a general method for controlling a deformation of the dose toward the center and toward the periphery sequentially or simultaneously. The process illustrates the production of objects without orifice from a dose containing an orifice.

Figure 22:
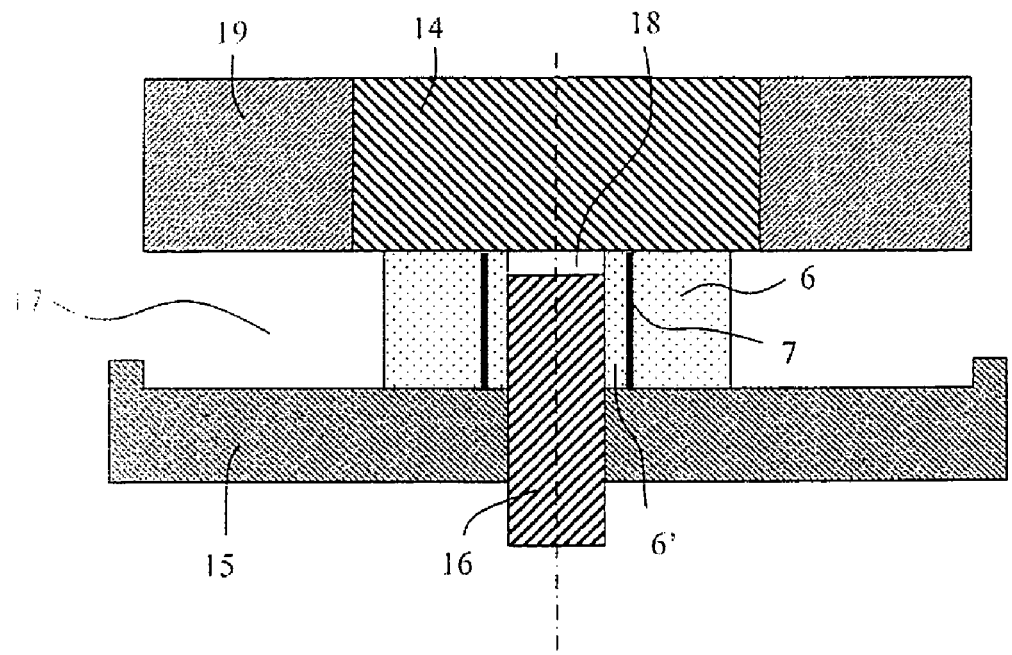

FIG. 22 shows the initial positioning of the dose in the compression mold.

Figure 23:
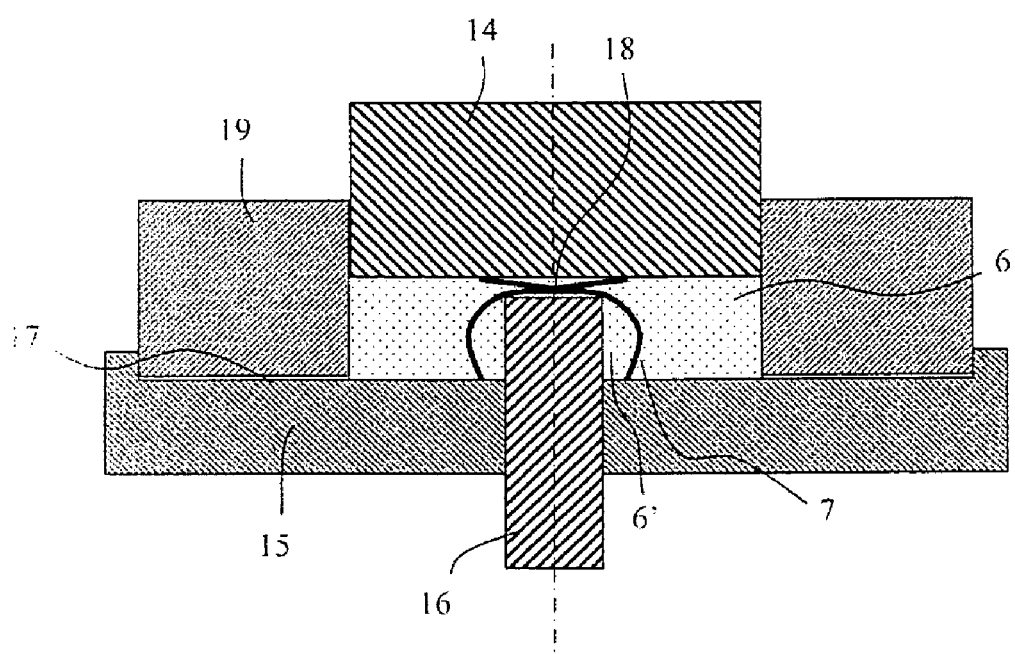

FIG. 23 illustrates the method for creating the deformation of the dose toward the center so as to fill the cavity 18.

Figure 24:
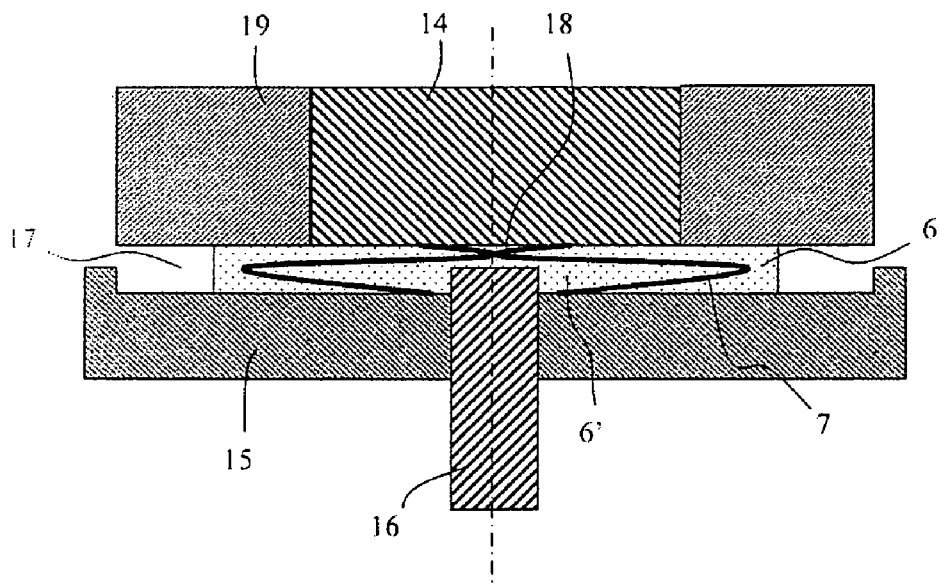

FIG. 24 illustrates the method for filling the peripheral cavity 17.

Figure 25:
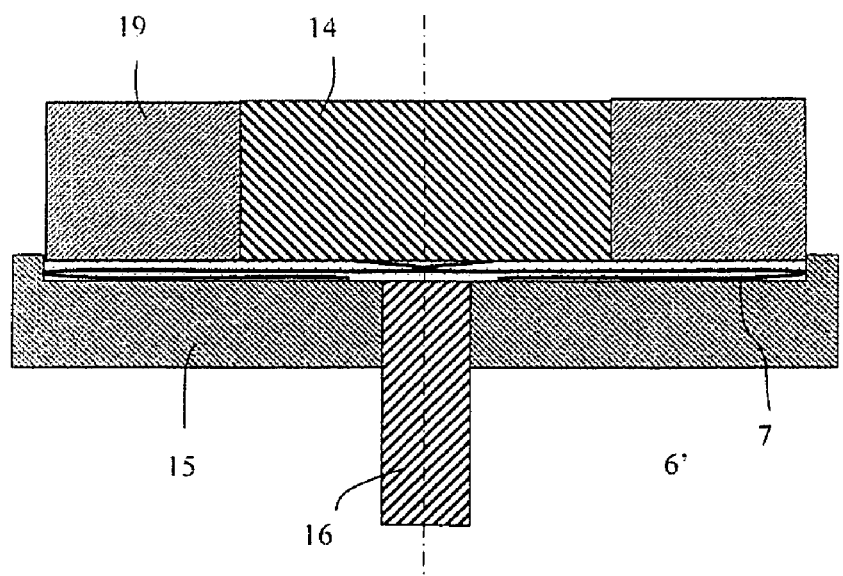

FIG. 25 shows the object in the mold following compression of the dose.

FIGS. 26 to 29 illustrate a method for producing an object containing an orifice.

Figure 26:
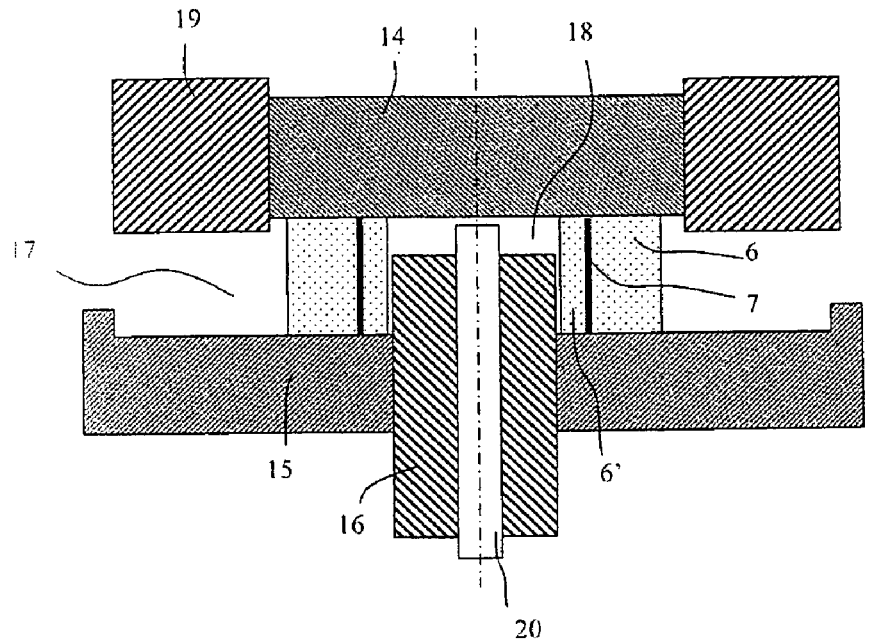

FIG. 26 shows the positioning of the dose in the compression mold.

Figure 27:
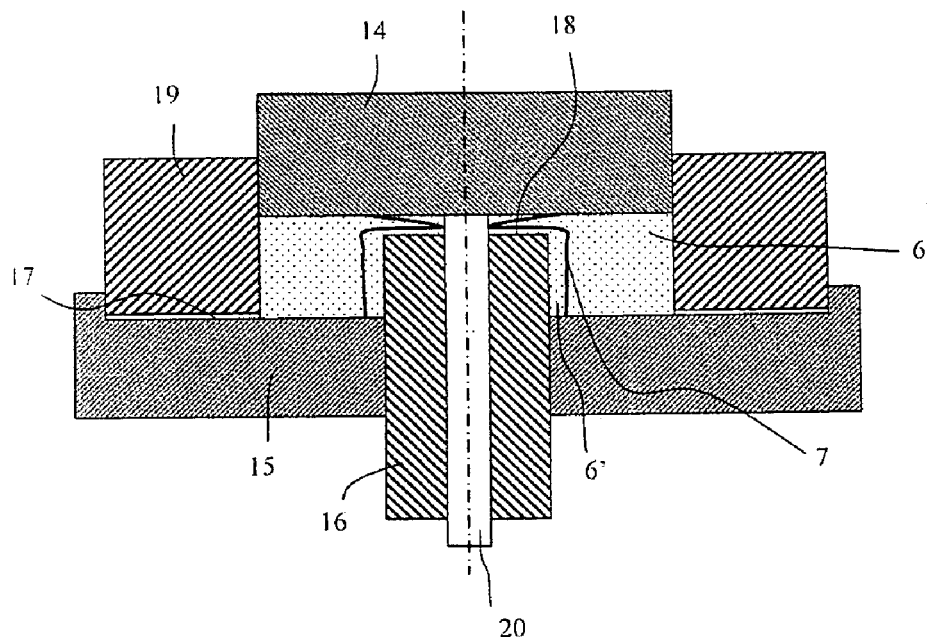

FIG. 27 illustrates the method for creating the deformation of the dose toward the center so as to fill the cavity 18 and form the orifice of the object.

Figure 28:
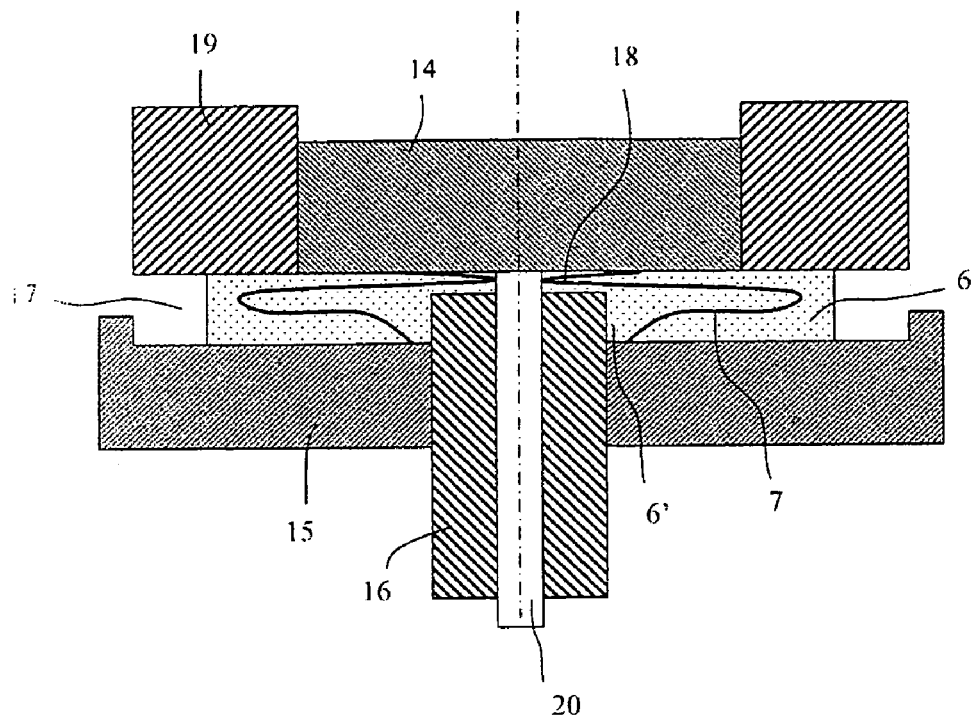

FIG. 28 shows the flow of the dose in the peripheral cavity 17.

Figure 29:
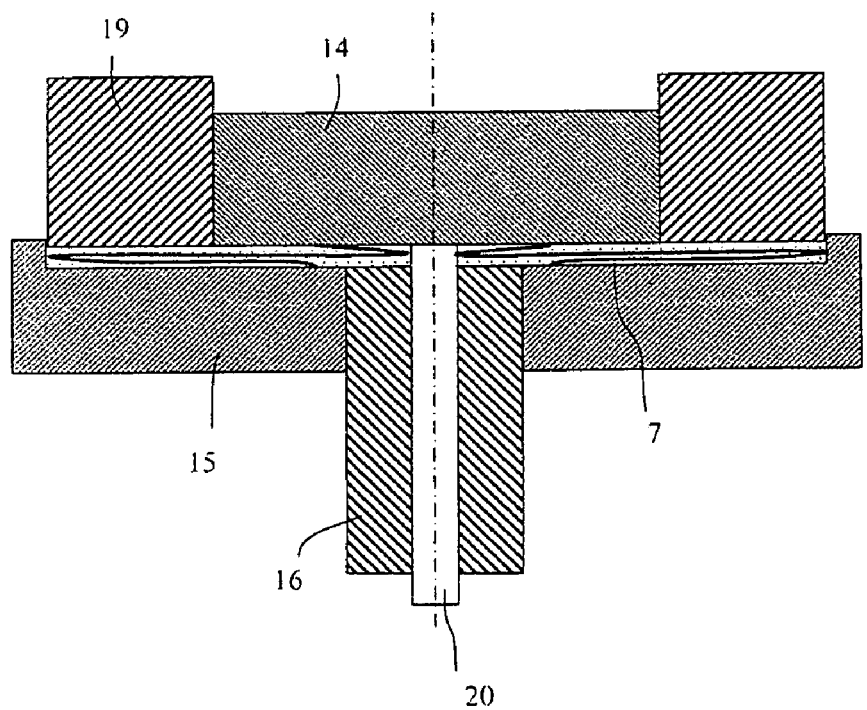

FIG. 29 shows the arrangement of the functional resin layer 7 in the object at the conclusion of the compression.

Figure 30:
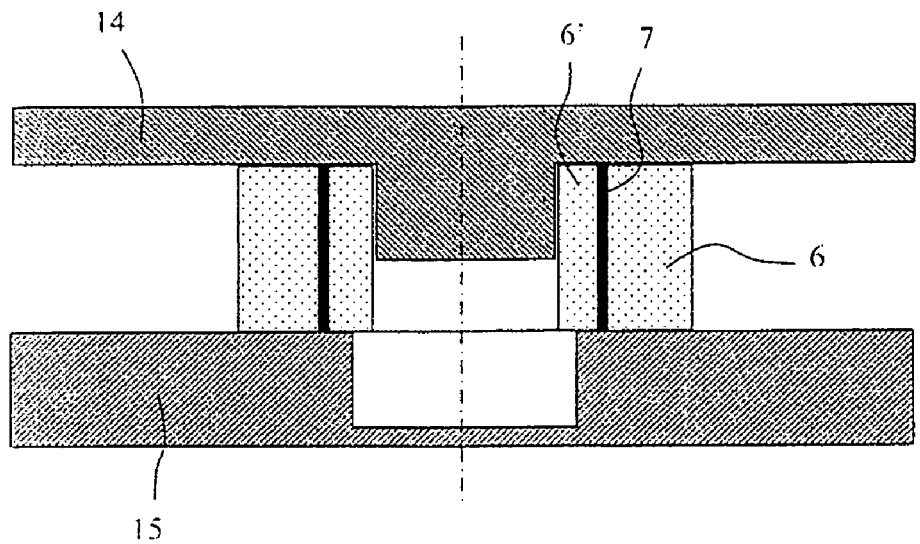
Figure 31:
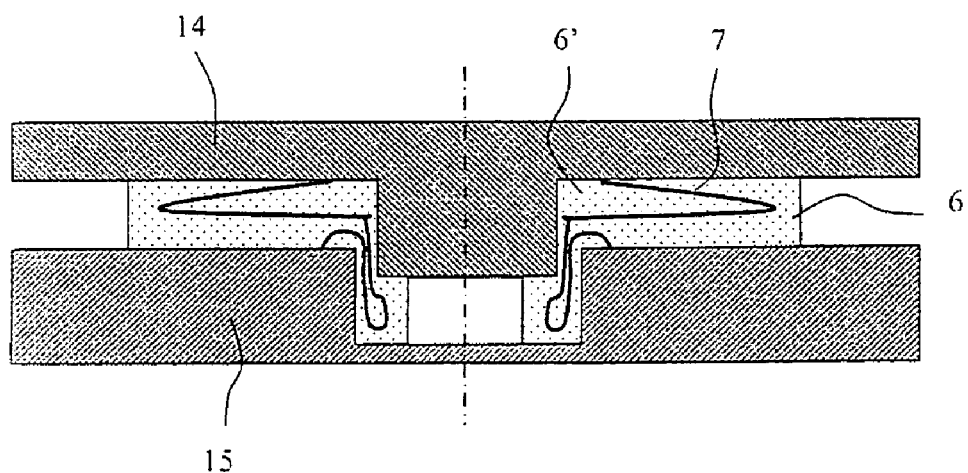

FIGS. 30 and 31 show a particularly advantageous geometry of the object, allowing the use of a simplified compression device. The molded object has an axial protuberance in its central part.

FIG. 30 shows the feeding of the tubular dose composed of resin layers 6, 7 and 6' between the top mold 14 and the bottom mould 15.

FIG. 31 illustrates the compression of the dose and the deformation of the barrier resin layer 7 during the flow. The resin layer 7 is entrained conjointly toward the periphery and toward the center.

Figure 32:
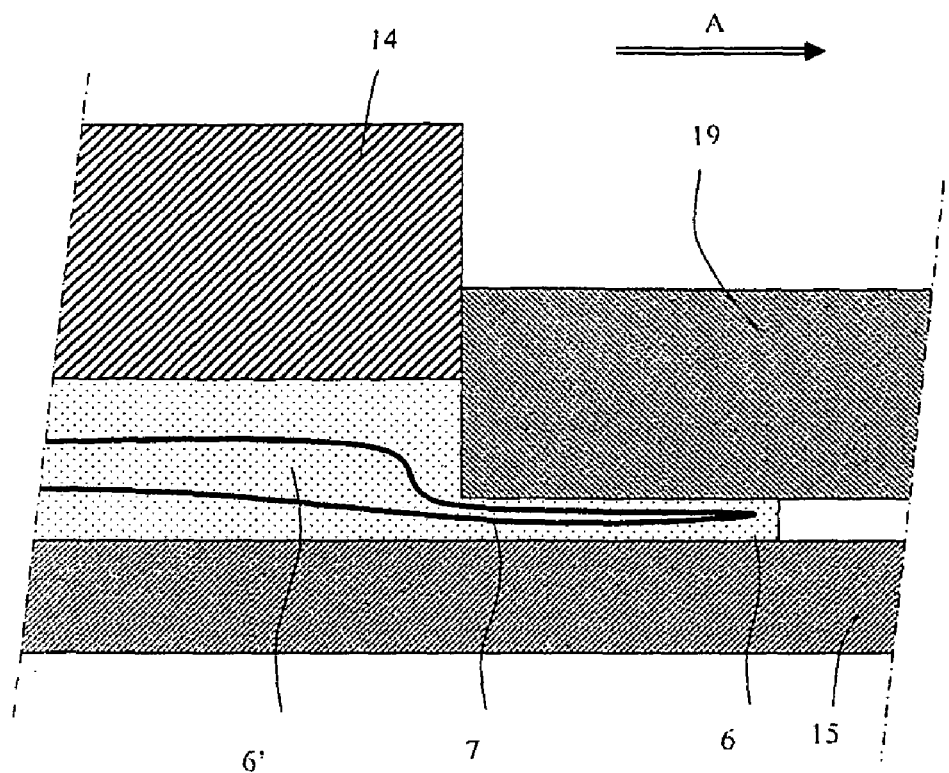
Figure 33:
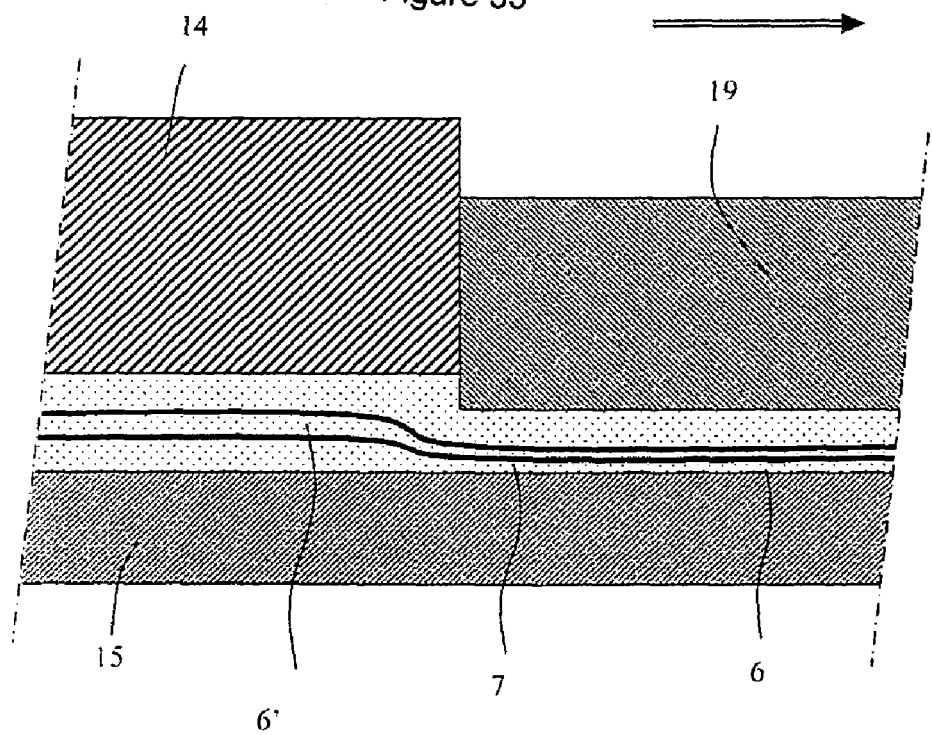
Figure 34:
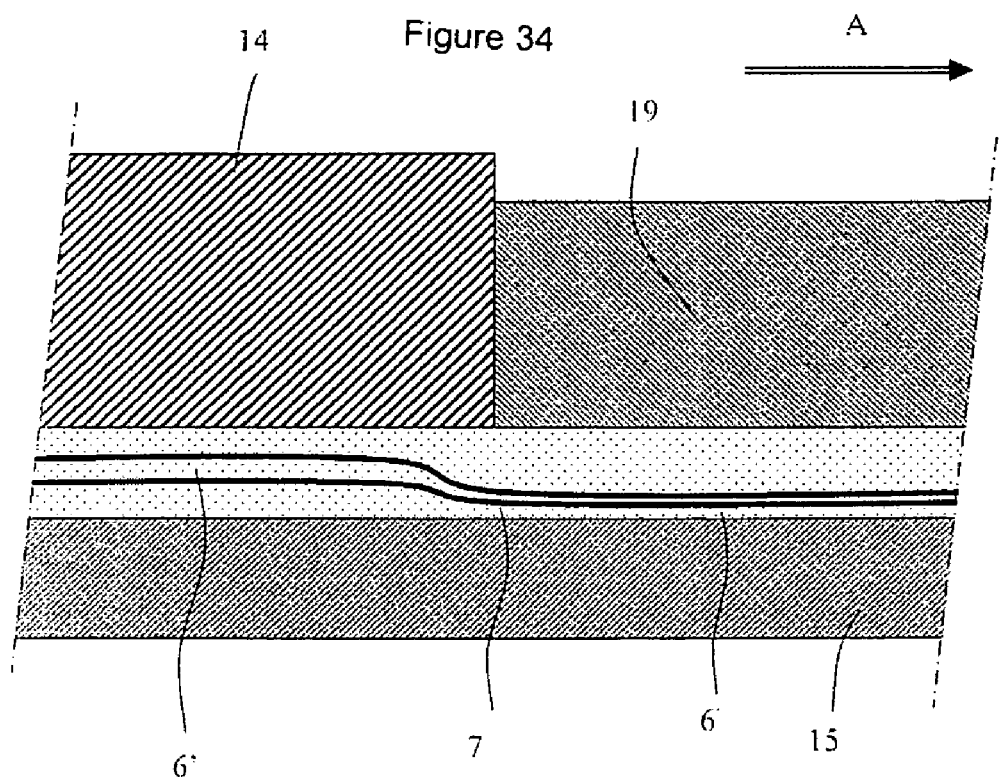

FIGS. 32 to 34 illustrate a method by which the position in the thickness of the double layer of functional resin 7 can be controlled. This method allows said double layer 7 to be brought nearer to the top wall or bottom wall of the object.

FIG. 32 shows the first step of the flow according to this method. The flow of the dose takes place in the direction A.

FIG. 33 shows a successive step involving the flow and the offsetting of the double layer 7 toward the bottom wall of the object owing to the increased clearance between the bottom plate 15 and the ring 19.

FIG. 34 shows the double layer 7 offset in the thickness of the object at the conclusion of the molding.

Figure 35:
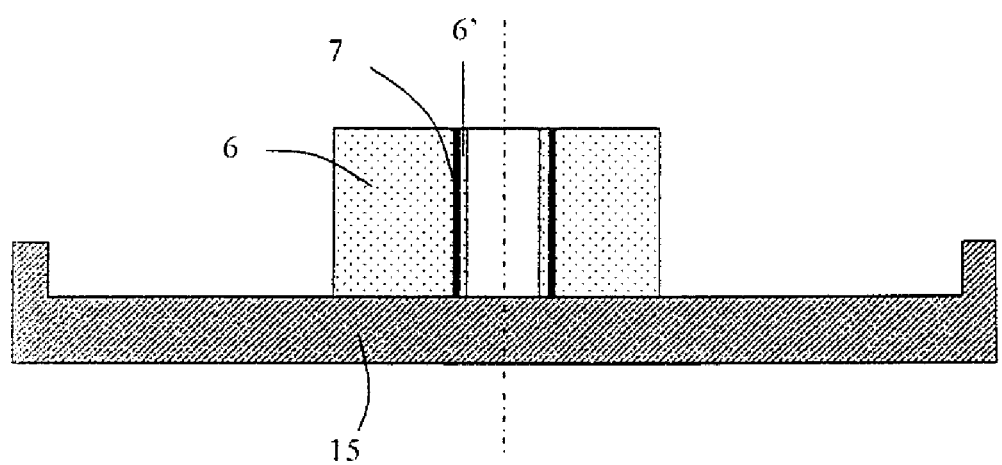
Figure 36:
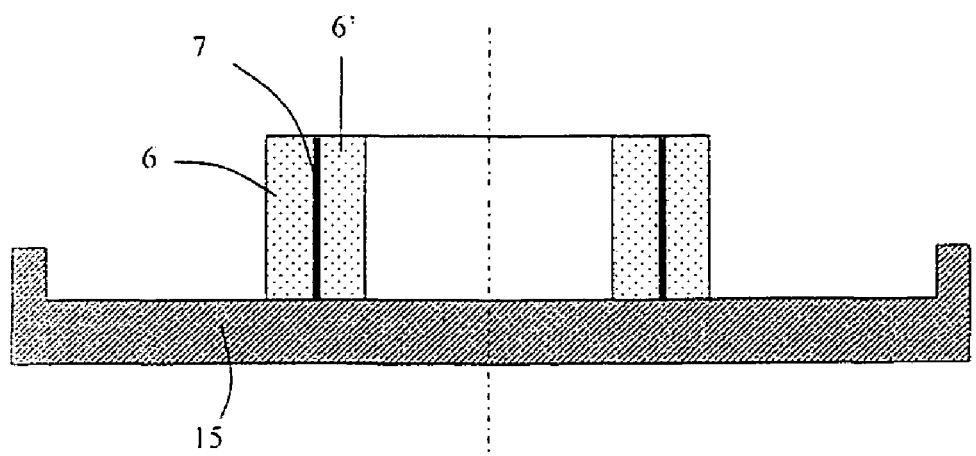
Figure 37:
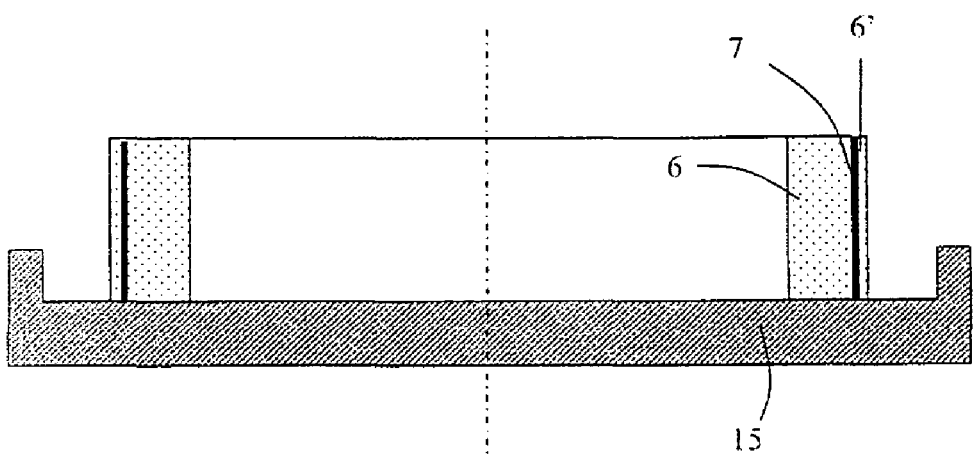

FIGS. 35 to 37 illustrate the dependence between the position of the functional layer 57 in the dose and the geometry of the dose.

Figure 1:
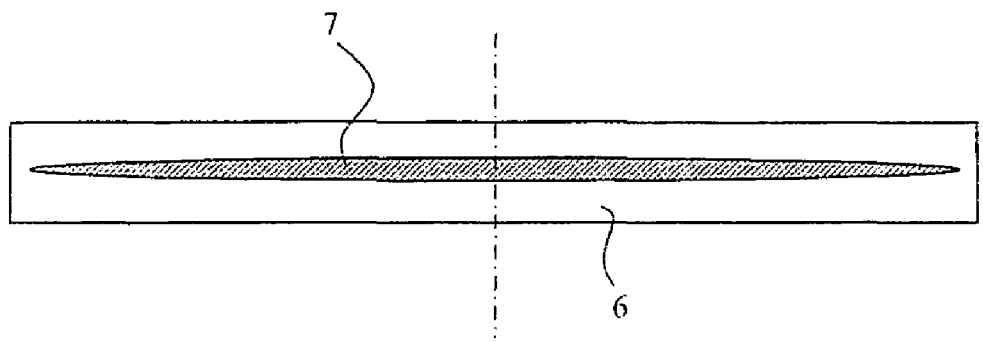
Figure 2:
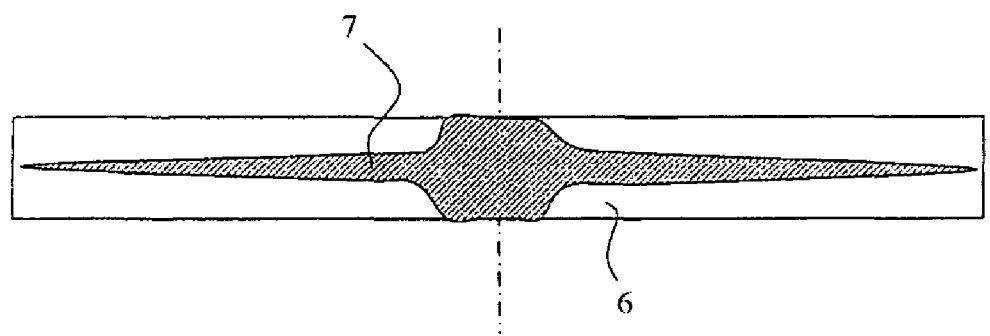
Figure 3:
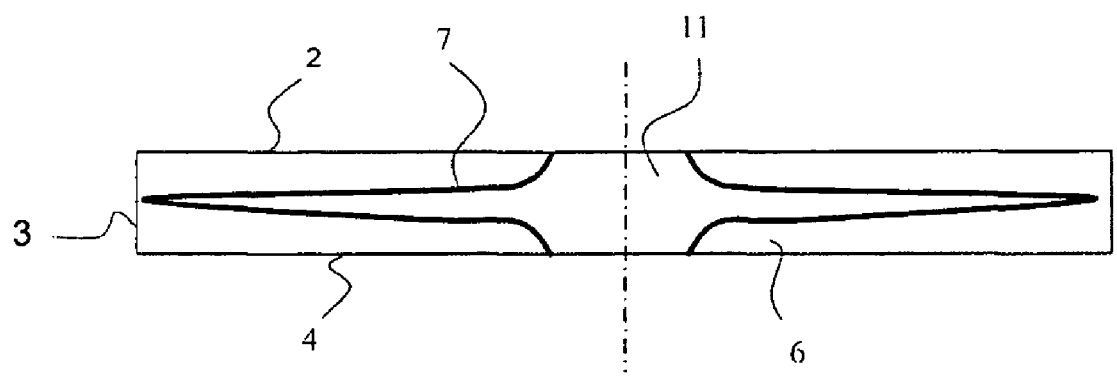
Figure 4:
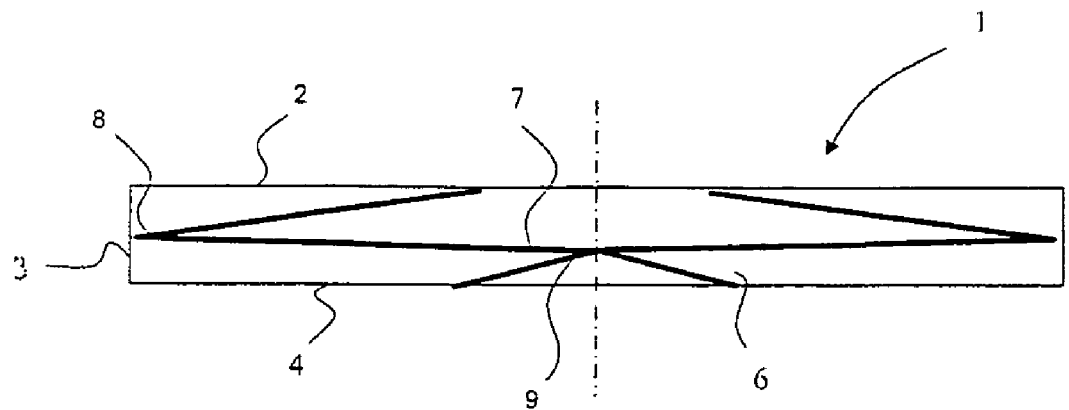

A first example of a multilayer object according to the invention is represented in sectional view in FIG. 4. This object 1 has a top face 2, a bottom face 4 and a border 3. A first resin 6 forms the top and bottom surfaces and the border of said object. A second resin 7 forms a layer disposed between the top face and bottom face of the object and extends throughout the object. Said resin layer 7 forms at least one double fold, said first fold being situated close to the border 3 and said second fold 9 being situated close to the axis of symmetry of the object. The resin layer 7 forming a characteristic zigzag-shaped double fold has two free ends, the first free end being situated close to the top surface 2 and the second free surface being situated close to the bottom surface 4. The ends of the resin layer 7 can lie flush with the surface of the object or can be totally imprisoned in the object, depending on the process settings.

Figure 5:
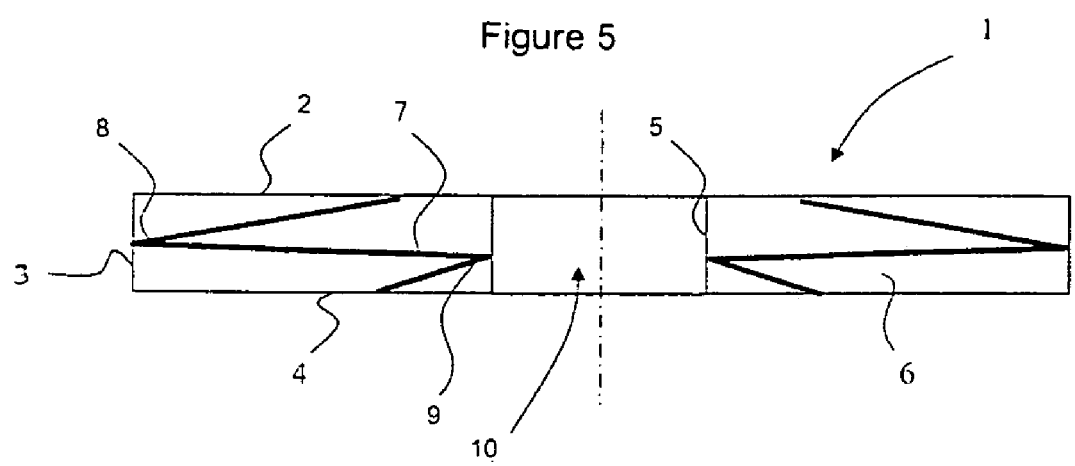

A second example of a multilayer object according to the invention is represented in sectional view in FIG. 5. This object has an orifice 10, a top face 2, a bottom face 4, and border 3 5. In this multilayer object, the barrier resin layer 7 forms at least one double fold, a first fold being situated close to the border 3 forming the periphery of the object and a second fold being situated close to the border 5 forming the orifice. In this object, containing an orifice, can be found the characteristic arrangement of the imprisoned layer 7 forming a "zigzag" type geometry and having free ends close to the top and bottom faces 2 and 4 of the object.

In the objects realized according to the invention, the thickness of the barrier resin layer 7 is fine and regular and is adjustable. Generally, a barrier resin layer less than 100 microns thick is sufficient and a thickness less than 50 microns is preferably chosen. The thickness of the barrier resin layer 7 can be controlled and modified according to the required barrier properties and the resins used.

Figure 6:
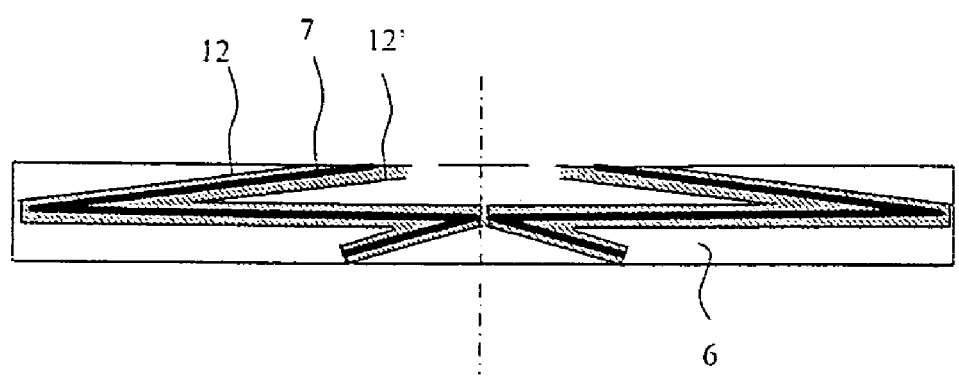

Generally, there is no adhesion between the barrier resin 7 and the resin 6 forming the object. This is especially the case when the barrier resin is an EVOH resin and the resin forming the object 6 belongs to the family of polyolefins (PE, PP). In certain cases, this poor adhesion is not prejudicial to the use and overall performance of said object. However, if the adhesion is necessary to ensure the mechanical and barrier properties of said object, a first solution consists in adding an adhesive and mixing it into the resin 6. A second solution consists in adding an adhesive layer on either side of the barrier layer, as is traditionally done in multilayer structures. FIG. 6 shows a multilayer object containing two layers 12 and 12' of adhesive resin situated on either side of the barrier resin layer 7 and imprisoned in the resin 6 forming the object. These multilayer structures are particularly advantageous.

Figure 7:
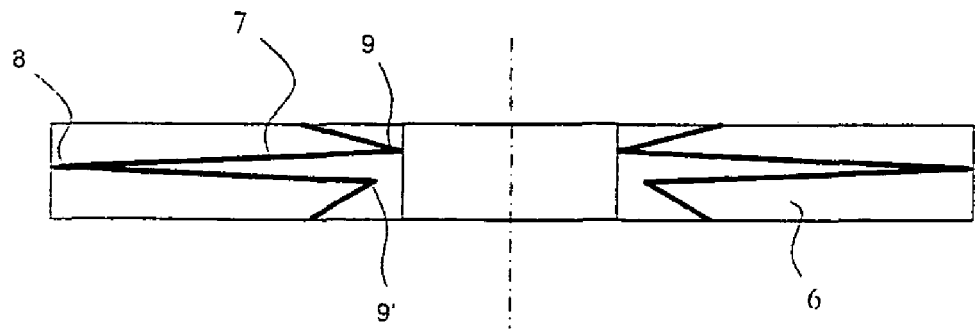
Figure 8:
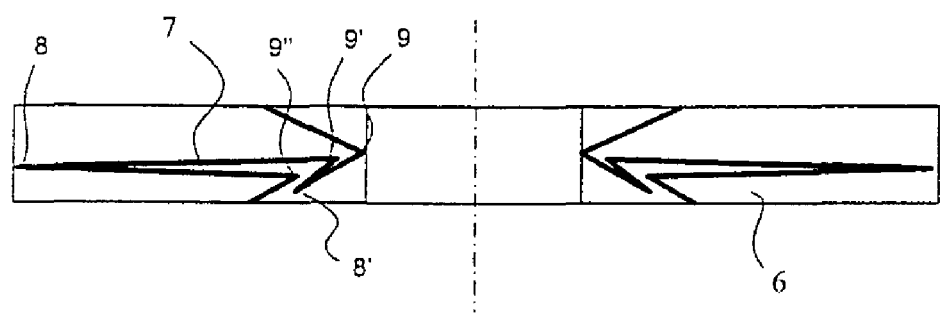
Figure 9:
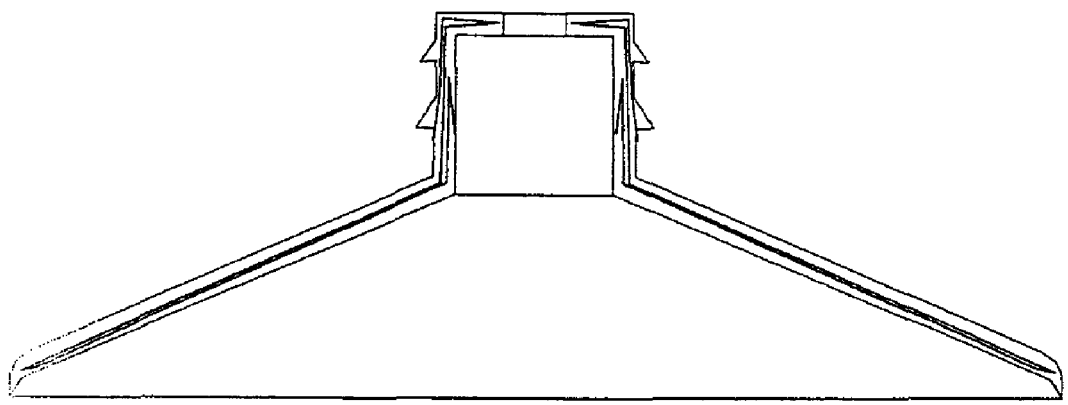
Figure 10:
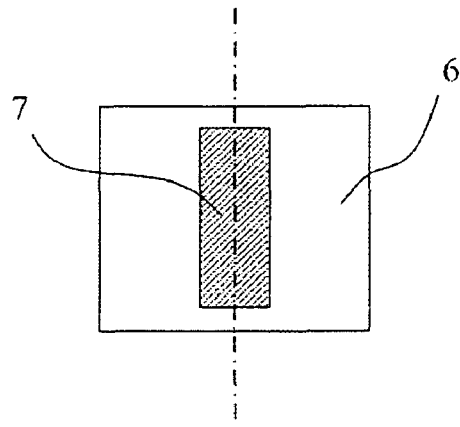
Figure 11:
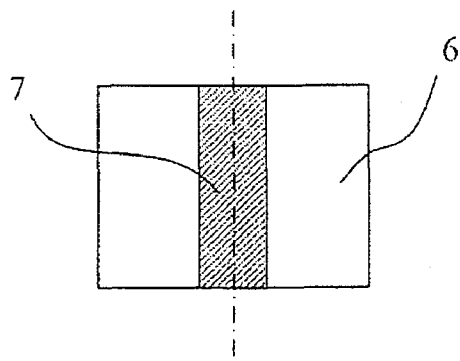
Figure 12:
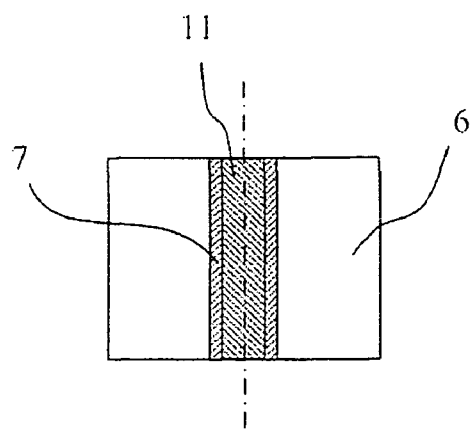

The objects realized according to the invention are not limited to the multilayer structures having two folds of the barrier resin layer 7. FIG. 7 shows an object which conforms to the invention and contains a barrier resin layer 7 forming 3 folds, respectively labeled 8, 9, 9'. Similarly, FIG. 8 illustrates an object whose barrier layer 7 forms 5 folds, respectively labeled 8, 8', 9, 9', 9". These examples are not exhaustive.

The objects realized according to the invention have particularly advantageous barrier properties. This can be explained, in part, by recognizing that the majority of objects realized according to the invention have at least one double barrier layer. This double protection affords both superior properties and a certain security should the layer prove locally defective.

The resins used within the scope of the invention correspond to the thermoplastic resins currently being used, and more particularly to those used in the packaging industry. Amongst the barrier resins can be cited ethylene vinyl alcohol copolymers (EVOH), polyamides such as Nylon-MXD6, acrylonitrile-methylacrylate copolymers (BAREX), fluorinated polymers such as PVDF. In this connection can also be cited a few resins which may be used to form the body 6 of the object: polyethylene (PE), polypropylene (PP), polystyrene (PS), polyamide (PA), polyester (PET). This list is not exhaustive. In the choice of resins, it is important to select products which have neighboring viscosities. In general, it is preferable to use resins which, at working temperature, have a viscosity ratio less than 10, and preferably a viscosity ratio less than 3 will be chosen.

Figure 13:
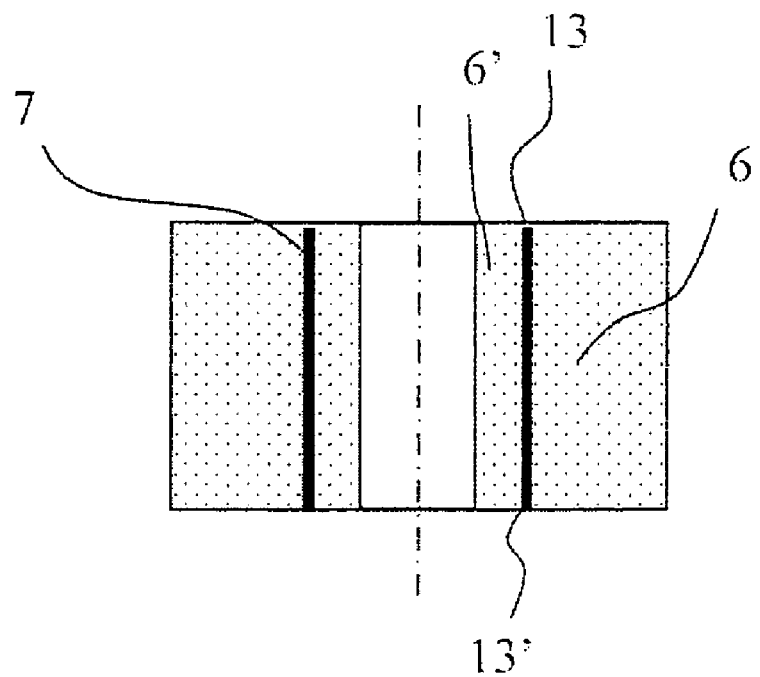

A first method for realizing multilayer objects according to the invention contains a first operation for extruding a multilayer dose of tubular geometry, followed by an operation for molding the object by compressing said dose in a mold. FIG. 13 shows a triple-layer dose, which can be used to realize multilayer objects as illustrated in FIGS. 4, 5, 7 and 8. In this dose, the barrier material 7 is imprisoned laterally between two resin layers 6 and 6'. Generally, the top 13 and bottom 13' ends of the barrier layer 7 are not imprisoned. The method used in the invention to displace the barrier resin layer during the compression of the dose rests upon the judicious exploitation of the flow mechanisms and, in particular, of the velocity gradients. It is generally considered that the flow velocity is weaker close to the wall of the mold than in the center of the flow. By using these flow velocity differences and by controlling these mechanism by a suitable compression method, it is possible to contain the spread of said barrier layer (7) and thus control the final position of said layer (7) in the molded object. A dose of tubular geometry is particularly advantageous, since this geometry facilitates the spread of the barrier layer 7 throughout the part, both periphery and in the central part. Indeed, during the compression along the axis of symmetry of the dose in a suitable device, the tubular geometry of said dose allows a material flow to be generated toward the axis of symmetry of the object and toward the periphery of the object. This flow of resin displaces the barrier layer 7. The flow toward the periphery entrains said barrier layer 7 up to the outer border of the object 3, and the flow toward the center entrains the barrier layer 7 up to the axis of symmetry for an object without orifice and up to the border 5 for an object containing an orifice. The realization of multilayer objects according to the invention calls for an optimization of the geometry of the dose (inner diameter, outer diameter, height, of the quantity of material in each layer, and of the compression parameters.

Figure 14:
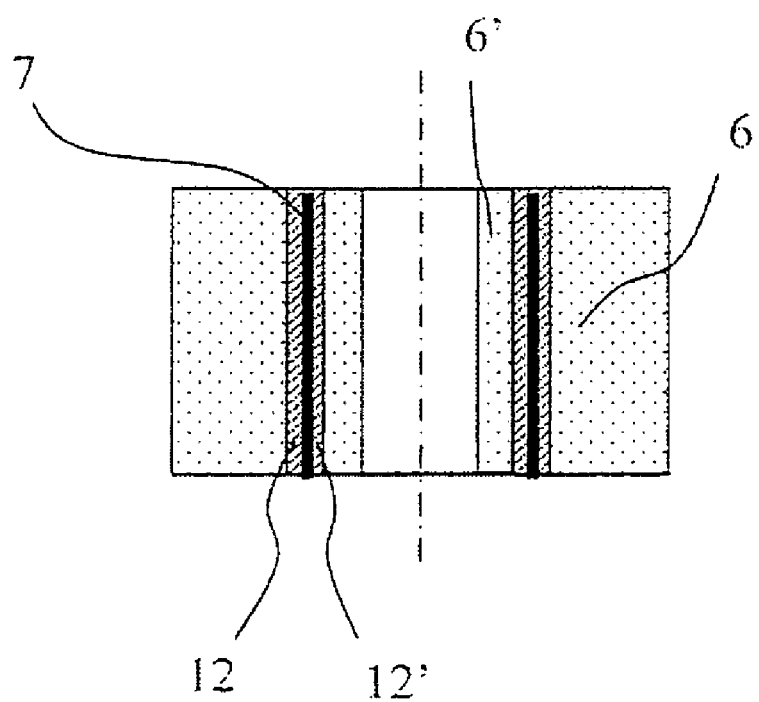

In the majority of the examples presented in this patent, for reasons of descriptive clarity, it has been chosen to use doses comprising only three resin layers. FIG. 14 shows a dose comprising 5 layers. The resins forming the layers 12 and 12' generally being resins which are classified as adhesive in order to adhere respectively to the functional resin layer 7 and to the resin layers 6 and 6' intended to form the structure of the object. An example of an object obtained from the aforesaid five-layer dose is illustrated in FIG. 6.

Figure 15:
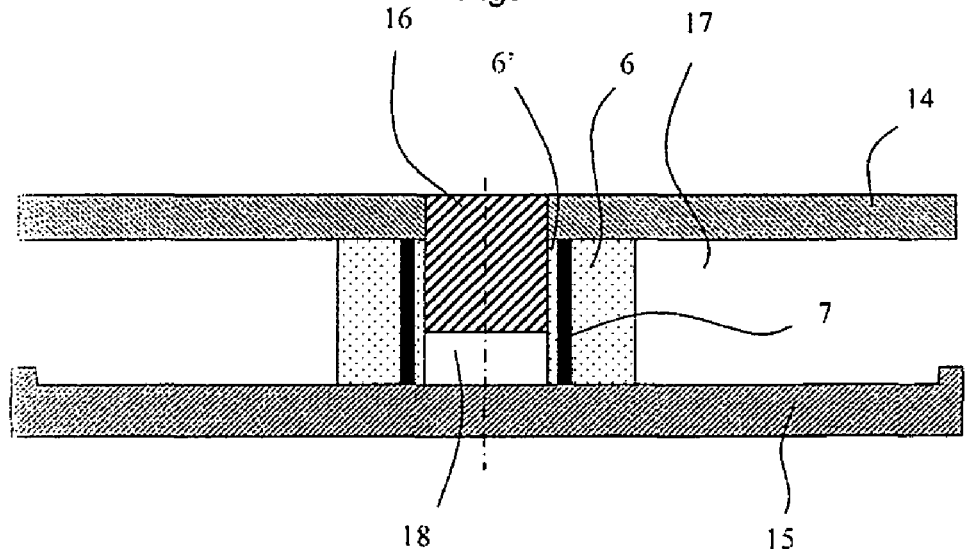
Figure 16:
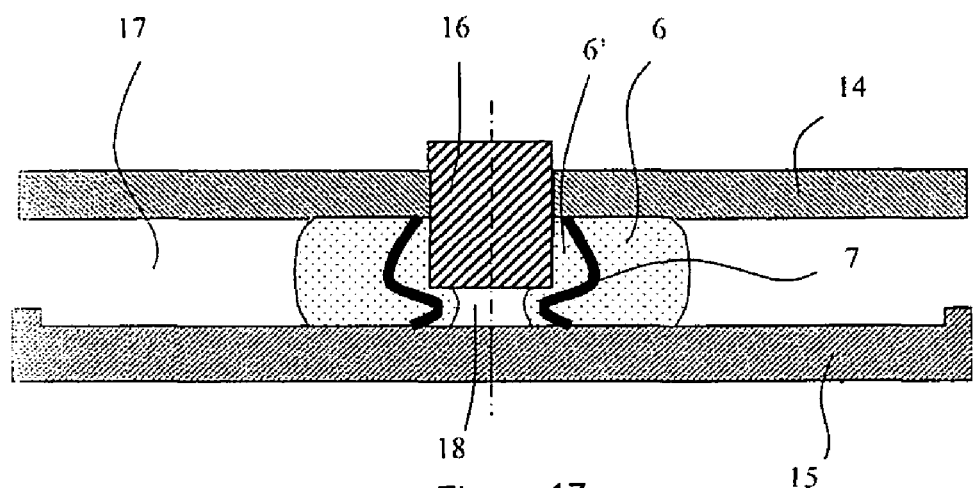
FIG. 16 shows the deformation of the dose during the compression.
Figure 17:
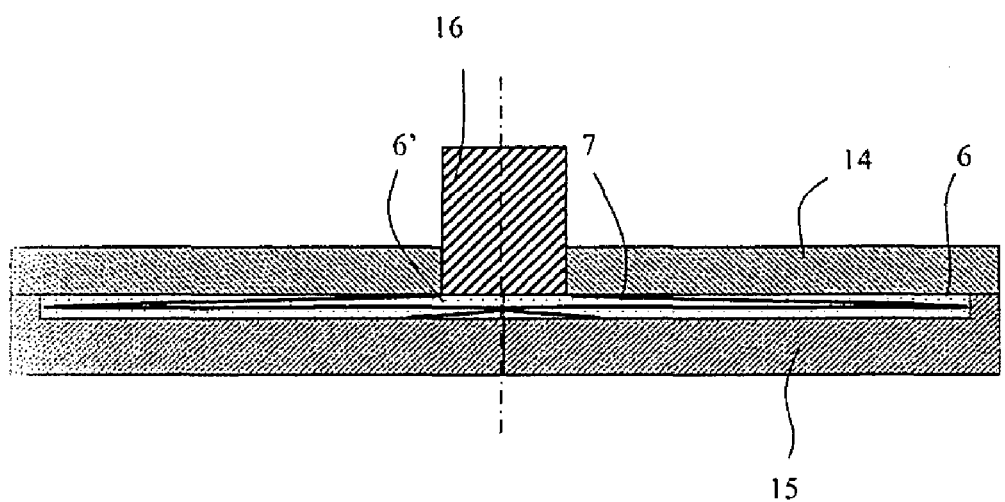
FIG. 17 shows the multilayer object obtained following compression of said dose.

An example of the realization of a multilayer object according to the first method is illustrated in FIGS. 15 to 17. According to this method, a multilayer dose of tubular geometry is deposited in a mold (FIG. 15). This dose comprises a barrier resin 7 partially imprisoned between the resins 6 and 6'. The compression device is represented diagrammatically by a top plate 14, a bottom plate 15 and a plunger 16. In the original position, the spacing between the plunger 16 and the bottom plate 15 is less than the spacing between the top and bottom plates 14 and 15. FIG. 16 illustrates the start of the compression of the dose between the parts of the device 14, 15 and 16. The dose progressively fills the cavities 17 and 18, the flow of the dose in the cavity 17 entraining the barrier resin layer 7 toward the periphery, the flow of the dose in the cavity 18 entraining the barrier layer 7 toward the center. FIG. 17 shows the distribution of the barrier resin layer 7 when the compression of the dose is ended. The flow of the dose in the cavity 17 has allowed the layer 7 to extend out to the periphery of the object and the flow of the dose in the cavity 18 has entrained the layer 7 up to the axis of symmetry of the object. Other devices may be used for the realization of multilayer objects from a tubular dose. These devices have in common that they allow the flow of the dose toward the periphery and toward the center. These flows can be simultaneous or sequential according to the devices chosen and the control sequences. It is generally necessary to provide an evacuation of the air imprisoned in the cavity 18. This evacuation of the air can be effected with vents or other means currently employed. This method for realizing multilayer objects from a tubular dose is of particular interest for the realization of objects having an orifice. The realization method is similar to that presented in FIGS. 15 to 17, the geometry of the mold is adapted.

A second method for realizing multilayer objects according to the invention consists in starting from a multilayer dose in the form of a rod. The second method consists in forcing a flow of the dose toward the center and the periphery of the object, the flow toward the periphery entraining the barrier resin layer toward the end of the object and the flow of the dose toward the center entraining the barrier resin layer toward the center of the object. The invention consists principally in entraining the barrier resin layer toward the center of the object, this flow being difficult to create with a dose whose geometry is a rod. The method consists in creating a compression, then a decompression motion in the central part of the object in order to attract the barrier resin layer 7 into the central part.

An example of the realization of multilayer objects according to the second method is illustrated in FIGS. 18 to 21. FIG. 18 shows the feeding of a multilayer dose of cylindrical geometry comprising a first resin 6' forming the central part, a barrier resin 7 forming the intermediate layer and a resin 6 forming the peripheral layer of the dose. This dose is positioned in a compression device comprising a top plate 14, a bottom plate 15 and a plunger 16. FIG. 19 illustrates the fall of the plunger 20, compressing the central part of the dose and creating the flow of the resin 6' toward the periphery. The relative motion of the plunger 16 and of the bottom plate 15 must be such that the resulting clearance in the cavity 18 must be less than the final thickness of the object. This compression motion causes the deformation of the barrier resin layer 7 toward the periphery of the object. FIG. 20 shows a subsequent step involving the compression of the dose. The relative motion of the top and bottom plates 14 and 15 creates a flow of the dose in the cavity 17. This flow entrains the barrier layer 7 toward the periphery of the object. In parallel, the plunger 16 is propelled with an upward motion, whereby the clearance in the cavity 18 is increased. This relative motion between the plunger 16 and the bottom plate 15 creates a flow of the dose toward the center of the object. This flow entrains the barrier resin layer 7 toward the center. FIG. 21 shows the distribution of the barrier resin layer 7 when the compression of the dose is ended. The flow of the dose in the cavity 17 has entrained the layer 7 up to the periphery of the object and the flow of the dose in the cavity 18 has entrained the layer 7 up to the axis of symmetry of the object. Other devices may be used for the realization of multilayer objects from a cylindrical multilayer dose. These devices have in common that they create the flow of the dose toward the periphery and toward the center, the flow toward the center being created by a compression-decompression motion.

The first method for realizing a multilayer object, which consists in compressing a multilayer dose comprising an orifice, and the second compression method, which consists in compressing a dose of cylindrical geometry, can be categorized into a large number of compression molding method in dependence on the compression device used and on motions during the compression. These methods consist in the controlled generation of the flow of the dose toward the periphery or toward the center of the mold, sequentially or simultaneously. A method which allows precise control of the flow toward the center or toward the periphery is illustrated in FIGS. 22 to 25. According to this method, it is possible to generate a flow toward the center by preventing the flow toward the periphery, or conversely, to create a flow toward the center by preventing a flow toward the periphery. It is equally possible to generate a simultaneous flow in both directions. A control method is illustrated in FIG. 22 to 25. FIG. 22 shows the positioning of the dose in a device comprising a top plate 14, a bottom plate 15, a plunger 16 and a ring 19. The dose comprises the resin layer 6, 7 and 6'. FIG. 23 shows how it is possible to generate a flow of the dose toward the center by reducing the clearance of the cavity 17 between the bottom plate 15 and the ring 19. According to the relative position of the ring 19 and of the bottom plate 15, it is possible to generate a flow purely in the cavity 18, or simultaneous flows in the cavities 17 and 18. FIG. 24 shows a flow of the dose in the cavity 17 in the wake of the increase in clearance between the ring 19 and the bottom plate 15. FIG. 25 shows the distribution of the barrier resin layer 7 at the conclusion of the molding. According to the chosen compression methods, the flows are more or less complex, with possibly toing and froing of the resins during the compression. These complex flows produce a final distribution of the barrier resin layer 7 which is more or less difficult to describe, such as that illustrated in FIG. 8, for example.

The objects containing an orifice can be realized according to the methods previously cited. However, for this type of object, it is preferable to use the first method, which consists in starting from a multilayer dose of tubular geometry. An example of the production of a part containing an orifice is illustrated in FIGS. 26 to 29. The molding device represented in FIG. 26 is identical to the device illustrated in FIG. 22 and additionally contains an apertural rod 20. The device described in FIG. 25 could equally be used with the addition of an apertural rod 20. FIG. 26 shows the positioning of the tubular multilayer dose in the device. FIG. 27 shows how it is possible to cause a deformation of the dose in the cavity 18 by compressing the dose between the top plate 14 and the bottom plate 15 and by constricting the flow between the ring 19 and the bottom plate 15. According to the constriction created, it is possible to generate a sequential or simultaneous flow in the cavities 18 and 17. Another control method could consist in initiating the deformation of the dose in the cavity 17 by constricting the dose between the plunger 16 and the top plate 14, then in next filling the cavity 18. FIG. 28 shows the deformation of the dose in the cavity 17. FIG. 29 illustrates the distribution of the different resins at the conclusion of the molding. The control sequences of the different parts of the device are dependent on the geometry of the object, on the rheology of the resins, on the geometry of the dose. An iterative setting method is often necessary to obtain the correct positioning of the barrier resin layer 7 in the object.

It is possible to realize multilayer objects according to the invention with a simplified compression device by making good use, during the compression, of the geometric peculiarities of the object, which allow a suitable flow of the resins toward the center of the object and toward the periphery. These objects generally have an axisymmetrical protuberance in the center of the object. An example is illustrated in FIGS. 30 and 31. FIG. 30 shows the feeding of the tubular multilayer dose 6, 7 and 6' into the device comprising a top mold 14 and a bottom mold 15. The crushing of the dose in the cavity of said mold is illustrated in FIG. 31. The barrier resin 7 is entrained conjointly toward the periphery and toward the center of the object.

The process generally produces multilayer objects containing a double barrier layer 7 positioned in a relatively centered and symmetrical arrangement in the thickness of the object, except at the level of the ends of said barrier layer 7 which are situated close to the surface of the object. It may be desirable for certain objects to bring the barrier layer 7 nearer to the top or bottom surface of the object. FIG. 32 to 34 illustrate a way of controlling the position of the double layer of barrier resin 7 in the thickness of the object. FIG. 32 shows the deformation of the dose in the direction A during the compression between the top plate 14 and the bottom plate 15. A reduced clearance is used between the ring 19 and the bottom plate 15. FIG. 33 shows the following phase of the process, which consists in increasing the clearance between the ring 19 and the bottom plate 15, whereas the dose continues to be compressed between the top plate 14 and the bottom plate 15, generating the flow in the direction A. It is observed that the double layer 7 then finds itself offset toward the bottom plate 15. FIG. 34 illustrates the positioning of the double barrier layer 7 at the conclusion of the process. This double layer is offset toward the bottom face of the molded object.

A complex relationship exists between the geometry of the object, the geometry of the dose, the rheology of the resins and the molding method by which multilayer objects according to the invention can be obtained. FIGS. 35 to 37 show the positioning of different doses in a same mold 15 prior to compression. The dose is constituted by three layers, respectively labeled 6, 7 and 6'. The layer 7 is a layer of functional resin. FIGS. 35 to 37 show doses of different diameter for producing the same object. It is important to observe that the position of the functional resin layer 7 in the dose varies according to the diameter of the dose. In FIG. 35, the diameter of the dose is small and the functional resin layer 7 is close to the orifice of said dose, whereas in FIG. 37 the diameter of the dose is large and the functional resin layer 7 is situated close to the peripheral surface of said dose. The position of the functional resin layer 7 in the dose is dependent on the respective flow distances of said dose toward the center and toward the periphery of the object. If the flow distance toward the center is less than the flow distance toward the periphery, then the functional layer 7 is positioned close to the axis of symmetry of the dose (FIG. 35) and, conversely, when the flow distance toward the center is greater than the flow distance toward the periphery, then the functional layer 7 is positioned close to the peripheral surface of said dose (FIG. 37). For substantially equivalent distances to be covered, the functional layer is positioned substantially symmetrically in said dose (FIG. 36). For reasons of descriptive clarity, the length of flow has been chosen as a parameter, but for a more exact position of said layer 7 in the dose it would be necessary to rely on material volume and not flow distance.

Other methods could be used to produce multilayer objects according to the invention. The addition of supplementary volumes in the cavity, commonly referred to as feeder heads, could be used to compensate an imprecise control of the process and to facilitate the settings. These feeder heads are next detached from the object and can be recycled. The feeder heads can be used to produce objects which are not axisymmetrical.

Another method could consist in promoting the flow toward the center or the periphery by increasing or reducing the gas pressure in the mold.

In the examples which are presented here, the doses and the objects are of simple geometry, but the invention obviously relates to any geometry of dose and of object.

Numerous arrangements of the barrier layer 7 in the dose are possible. It may be advantageous to couple to the invention a particular arrangement of the barrier layer 7, said arrangement being characterized in that the barrier layer 7 forms the shell of a body of revolution centered on the axis of symmetry. When the distance of the barrier layer 7 to the axis of symmetry is variable, the molding method can be simplified.

The invention has been described with a single barrier layer 7 distributed in the dose. Doses comprising a plurality of barrier layers 7 may equally be used, said barrier layers all being centered on the axis of symmetry of said dose. The multilayer objects obtained are characterized in that the barrier layers are placed at least partially one on top of the other and form at least one zigzag-shaped double fold.

Other dose geometries may be used. It has been observed that doses which have a part of their surface concave are particularly advantageous. Such dose geometries facilitate good distribution of the barrier layer in the multilayer object.

The realization of packagings or packaging components for food applications calls for good hygiene properties. It is thus often desirable for the barrier layer and the adhesive layers not to be in direct contact with the packaged product. It may be advantageous to imprison the barrier and adhesive layers totally in the dose, such that said barrier and adhesive layers are totally imprisoned in the object. Alternatively, it is possible for just one end of the barrier layer not to be imprisoned.

The invention claimed is:

1. A synthetic resin multilayer structure delimited by a top face, borders and a bottom face of surface area substantially identical to that of the top face, said structure comprising:
    a first thermoplastic resin layer defining said faces and said borders,
    a second thermoplastic resin layer, which is a barrier resin layer and is imprisoned in the first layer, and has a surface area at least equal to that of said faces,
    wherein the second layer forms at least one zigzag-shaped double fold.

2. The multilayer structure as claimed in claim 1, possessing an axis of symmetry.

3. The multilayer structure as claimed in claim 1, containing a central orifice passing through said structure.

4. The multilayer structure as claimed in claim 3, wherein it forms a tube shoulder.

5. The multilayer structure as claimed in claim 1, wherein the second layer itself forms a multilayer structure comprising a layer of barrier resin imprisoned between two layers of adhesive resin.

6. A synthetic resin multilayer structure delimited by a top face, borders and a bottom face of surface area substantially identical to that of the top face, said structure comprising:
    a first thermoplastic resin layer defining said faces and said borders,
    a second thermoplastic resin layer, which has two free ends and is a barrier resin layer and is imprisoned in the first layer except for the two free ends, of surface area at least equal to that of said faces,
    wherein the second layer forms at least one zigzag-shaped double fold.

7. The multilayer structure as claimed in claim 6, wherein a free end of the second layer is in contact with an outer side of the structure at a level of one of said faces.

8. The multilayer structure as claimed in claim 7, wherein the free end of the second layer is in contact with the outer side of the structure at the level of the top face, and wherein another free end of the second layer is in contact with the outer side of the structure at a level of the bottom face.

* * * * *